United States Patent [19]

Grenier

[11] Patent Number: 5,328,215

[45] Date of Patent: Jul. 12, 1994

[54] PIPE JOINT ASSEMBLY

[75] Inventor: Wilfred J. Grenier, Rutland, Mass.

[73] Assignee: Rovac Corporation, Rochdale, Mass.

[21] Appl. No.: 944,373

[22] Filed: Sep. 14, 1992

[51] Int. Cl.⁵ .................... F16L 39/00; F16L 21/06
[52] U.S. Cl. .................. 285/318; 285/322; 285/323; 285/105
[58] Field of Search .............. 285/318, 105, 232, 323, 285/322

[56] References Cited

U.S. PATENT DOCUMENTS

| 3,724,880 | 4/1973 | Seiler | 285/105 |
| 3,815,940 | 6/1974 | Luckenbill | 285/323 |
| 4,586,734 | 5/1986 | Grenier | 285/340 |

FOREIGN PATENT DOCUMENTS

| 537711A1 | 4/1993 | European Pat. Off. | 285/322 |
| 1-247886 | 10/1989 | Japan | 285/322 |
| 1-247889 | 10/1989 | Japan | 285/322 |
| 2-51693 | 2/1990 | Japan | 285/322 |
| 2-51694 | 2/1990 | Japan | 285/322 |

Primary Examiner—P. Austin Bradley
Assistant Examiner—Jeffrey T. Knapp
Attorney, Agent, or Firm—John E. Toupal; Harold G. Jarcho

[57] ABSTRACT

A coupling assembly for use in connecting one end of a first tubular member to a component of a piping system includes a receiving tubular member defining an opening adapted to receive the first tubular member, the receiving tubular member having an inner portion defining an inner bore dimensioned to receive the one end and an outer portion defining an internal annular cavity intersecting the inner bore and projecting radially outwardly therefrom, the annular cavity comprising an annular wall portion tapered radially inwardly and projecting longitudinally toward the opening. Also included in the assembly is an annular seal member and a lock ring both disposed in the annular cavity between the first tubular member and the receiving tubular member, the lock ring having an outer circumferential surface portion adapted to engage said tapered wall portion and an inner circumferential surface portion adapted to engage an external wall portion of the first tubular member.

23 Claims, 3 Drawing Sheets

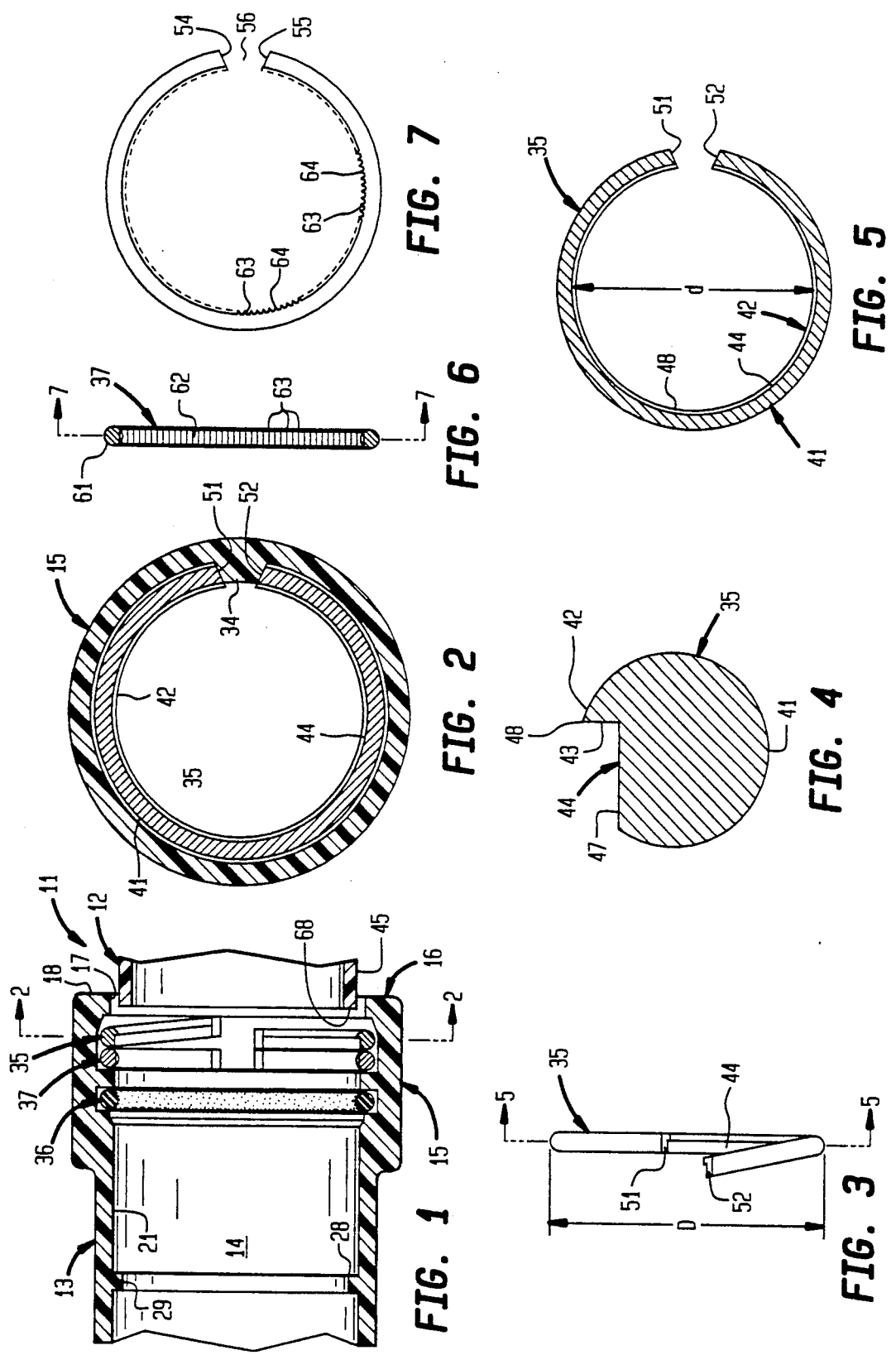

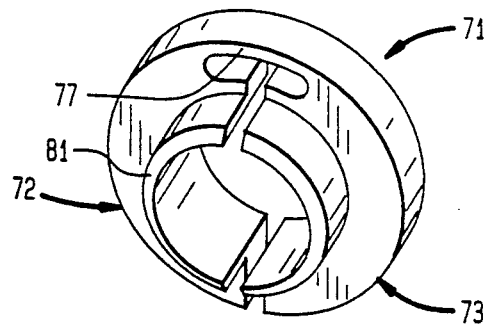
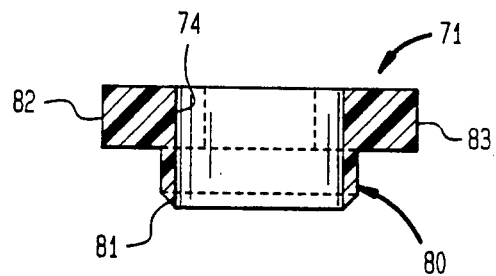
FIG. 10    FIG. 11
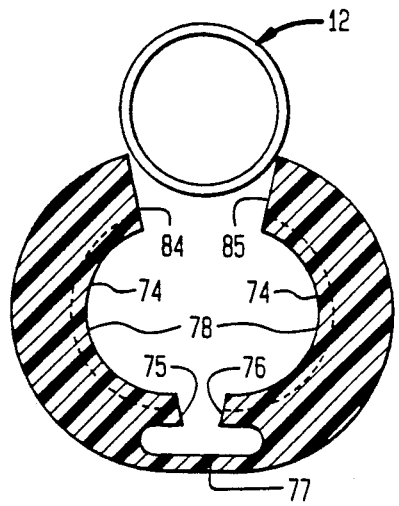
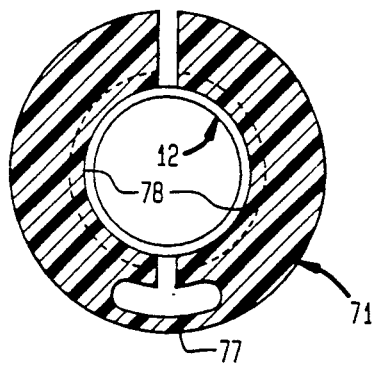
FIG. 12    FIG. 13
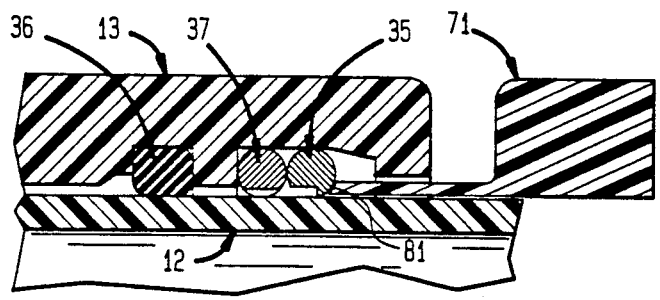
FIG. 14

PIPE JOINT ASSEMBLY

BACKGROUND OF THE INVENTION

The invention relates generally to an improved pipe coupling assembly and, more particularly, to an easily assembled and disassembled pipe coupling assembly.

Known methods for connecting a length of metal pipe or tubing to valves or pipe fittings such as elbows and tees include the use of threaded connectors, soldering, compression fitting, flaring, and welding. Non-metallic pipe, such as thermoplastic pipe, may also be joined by adhesives.

These methods are all subject to various drawbacks. Methods calling for the application of heat or force can be awkward and time consuming to practice in cramped and inaccessible areas, for example, areas in which residential plumbing is typically located. Soldering, welding and the like require the attention of a skilled worker using special tools to produce a good connection. Moreover, it is often difficult and time consuming to disconnect a length of pipe from a fitting once they have been joined, and it is often not possible to disassemble the joint without damaging the pipe or the fitting to such an extent that they cannot later be rejoined.

Acceptable pipe joints are more difficult to make when the pipe is to carry a fluid under pressure. Even where threaded pipe and threaded connectors are used, greater skill is required to produce a strong and leakproof seal which will withstand the pressure rating of the pipe being joined. For proper sealing under pressure, washers or O-rings are often included in the joint. If the washer and pipe are made of dissimilar metals, they will sometimes undergo electrolysis in the presence of moisture in the joint or water and chemical agents flowing through the pipe. Electrolytic action leads to degradation of the washer, which can eventually cause the joint to leak and loosen the locking action of lock washers.

Some of the aforementioned drawbacks are overcome by the use of plastic pipe joined by adhesive. But plastic pipe is difficult to connect directly to metal valve fittings without special adaptors. Moreover, once sealed with adhesive, prior plastic pipe joints cannot be readily undone. Disclosed in U.S. patent application Ser. No. 07/747,290, now abandoned, is an improved coupling assembly that alleviates many of the above noted problems. However, the operational characteristics of the disclosed coupling are not suitable for all applications.

The object of this invention, therefore, is to provide an improved pipe coupling assembly that can be easily assembled and disassembled by unskilled workers.

SUMMARY OF THE INVENTION

The invention is a coupling assembly for use in connecting one end of a first tubular member to a component of a piping system and including a receiving tubular member defining an opening adapted to receive the first tubular member, the receiving tubular member having an inner portion defining an inner bore dimensioned to receive the one end and an outer portion defining an internal annular cavity intersecting the inner bore and projecting radially outwardly therefrom, the annular cavity comprising an annular tapered wall portion tapered radially inwardly and projecting longitudinally toward the opening. Also included in the assembly is an annular seal member and a split lock ring both disposed in the annular cavity between the first tubular member and the receiving tubular member, the lock ring having an outer circumferential surface portion adapted to engage said tapered wall portion and an inner circumferential surface portion adapted to engage an external wall portion of the first tubular member. The lock ring is formed of spring material and adapted to expand circumferentially into the annular cavity during insertion of the first tubular member into the receiving tubular member and to be compressed between the tapered wall portion and the external wall portion in response to relative longitudinal separating movement between the first tubular member and the receiving tubular member. In addition, the inner circumferential surface portion defines a circumferentially extending knife edge for penetrating the external wall portion so as to prevent longitudinal movement of the first tubular member relative to the receiving tubular member.

According to one feature of the invention, the knife edge is formed by a circumferential groove in the lock ring. The easily formed groove provides the desired knife edge for locking the two tubular members.

According to other features of the invention, the groove defines one wall terminated by the circumferential edge and oriented substantially perpendicular to the external wall portion, and another wall substantially perpendicular to the one wall and extending between the one wall and an outer surface of the lock ring. An effective knife edge is formed by the one and another walls.

According to another feature of the invention, the lock ring has an inner diameter less than the outer diameter of the first tubular member, has first and second ends normally axially displaced, and the first and second ends are forced into substantial alignment in response to compression of the lock ring between the tapered wall portion and the external wall portion. The spring characteristics of the split ring facilitate its expansion into the annular cavity and create a longitudinally directed force that restricts movement of the first tubular member into the receiving tubular member.

According to an additional feature, the assembly includes an auxiliary ring having separated ends and disposed in the annular cavity between said lock ring and the sealing member, the auxiliary ring being engaged between an inner surface of the cavity and the external wall portion, and an inner circumference of the auxiliary ring defining longitudinal edges projecting substantially parallel to a longitudinal axis of the first tubular member and adapted to penetrate the outer surface thereof. The auxiliary ring prevents rotation of the first tubular member within the receiving tubular member.

According to yet other features of the invention, the annular cavity further comprises a cylindrical wall portion extending between the tapered wall portion and the inner bore, the auxiliary ring and the sealing member are adapted for engagement between the cylindrical wall portion and the first tubular member, and the lock ring is dimensioned so as to prevent engagement thereof with the cylindrical wall portion during its circumferential expansion by the first tubular member. This feature facilitates insertion of the first tubular member into the receiving tubular member.

According to still another feature of the invention, the tapered wall portion terminates with a radially inwardly directed rim forming a shoulder stop portion at an outer end of the receiving tubular member, and the stop portion is adapted to engage the lock ring in response to the separating movement. The stop portion positively retains the lock ring within the completed assembly.

The invention also encompasses a disengagement tool for use with the above assembly and including first and second arcuately shaped parts attached by a flexible connector and each having a longitudinally extending inner cylindrical surface conforming to the outer surface of the first tubular member and adapted for engagement therewith in a juxtaposed relationship to form a composite outer tube, the composite outer tube adapted for sliding movement on the first tubular member and having an actuator annular end adapted to be pushed through the opening into the annular cavity and into forcible engagement with the lock ring so as to cause circumferential expansion thereof. The disengagement tool eliminates engagement between the knife edge and the first tubular member to permit removal thereof.

DESCRIPTION OF THE DRAWINGS

These and other objects and features of the invention will become more apparent upon a perusal of the following description taken in conjunction with the accompanying drawings wherein:

FIG. 1 is a longitudinal cross sectional view of a coupling assembly according to the invention;

FIG. 2 is a cross sectional view taken along lines 2—2 of FIG. 1;

FIG. 3 is a side view of a lock ring utilized in the assembly of FIG. 1;

FIG. 4 is a cross sectional view taken along lines 4—4 in FIG. 3;

FIG. 5 is a cross sectional view taken along lines 5—5 in FIG. 3;

FIG. 6 is a side view of an auxiliary ring utilized in the assembly of FIG. 1;

FIG. 7 is a cross sectional view taken along lines 7—7 in FIG. 6;

FIG. 10 is a perspective view of a disengagement tool for use in disassembling the pipe coupling shown in FIG. 1;

FIG. 11 is a longitudinal cross sectional view of the tool shown in FIG. 10;

FIG. 12 is a transverse cross sectional view of the tool shown in FIG. 10;

FIG. 13 is a transverse cross sectional view showing the tool of FIG. 10 positioned over a tube; and FIG. 14 is a cross sectional view illustrating use of the disengagement tool shown in FIGS. 10-13.

DESCRIPTION OF THE PREFERRED EMBODIMENT

Figure 9:
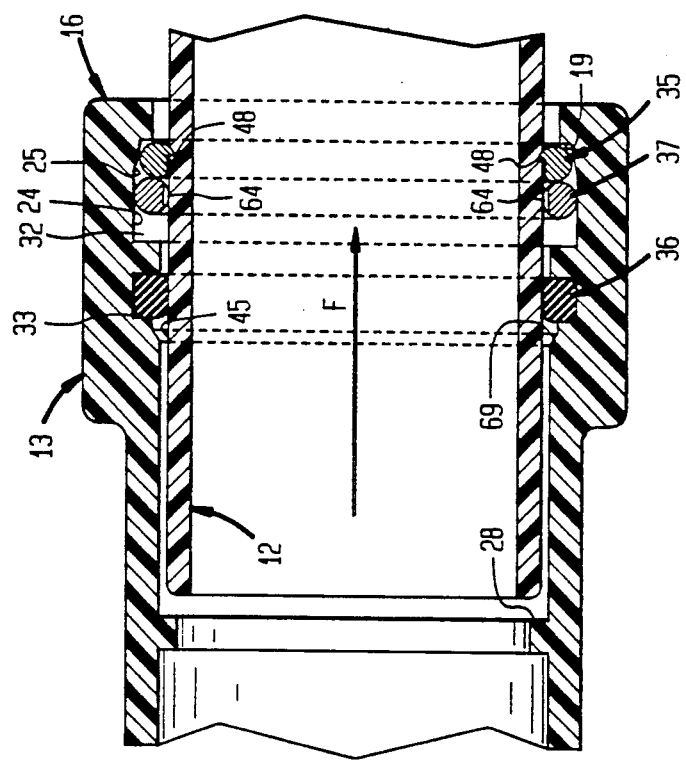
FIG. 9 is a cross sectional view after assembly of the pipe coupling shown in FIG. 1.

Illustrated in FIGS. 1 and 2 is a pipe coupling assembly 11 including an inner first tubular member 12 and an outer receiving tubular member 13. The tubular member 12 generally will be a length of pipe or tubing such as commonly employed for the delivery of fluids. For the purposes of the invention no distinction is to be made between pipe and tubing, and as understood herein both are embraced by the word "pipe". The embracing tubular member 13 will generally form a part of a pipe fitting, such as an elbow, tee, or the like, or will form a part of some other component of a piping system, such as a valve.

The receiving tubular member 13 includes an inner portion 14, an outer portion 15 and an end portion 16 with a radially inwardly directed rim 18 that defines a circular opening 17 and an inwardly directed shoulder 19. Defined by the inner portion 14 of the receiving tubular member 13 is an inner bore 21 dimensioned to snugly receive the outer surface of the first tubular member 12. The outer portion 15 of the receiving tubular member 13 defines an annular cavity 22 intercepting the inner bore 21 and projecting radially outwardly therefrom. Forming the annular cavity 22 is a cylindrical wall portion 24 and an annular tapered wall portion 25 joining the cylindrical wall portion 24 and the shoulder 19 surrounding the opening 17. An annular gap 27 is formed between the first tubular member 12 and the rim 17 which has a diameter larger than the outer surface thereof. Defining an annular shoulder 28 on the receiving tubular member 13 is a counterbore 29. An annular rib 31 on the receiving tubular member 13 projects inwardly from the cylindrical portion 24 and separates the cavity 22 into longitudinally separated cavity portions 32 and 33. Projecting inwardly from the cylindrical wall portion 24 in the cavity portion 32 is a longitudinally disposed ridge 34.

The pipe coupling assembly 11 also includes a split lock ring 35 disposed in the cavity portion 32, a sealing member 36 such as a resilient O-ring disposed in the cavity portion 33, and a split auxiliary ring 37 disposed in the cavity portion between the lock ring 35 and the annular rib 31.

The lock ring 35 is made from a material suitable to establish a good spring characteristic. As shown in FIGS. 3-5, the lock ring 35 has a circular cross-section, an outer circumferential surface portion 41 of diameter D less than the diameter of the adjacent cylindrical wall portion 24, and an inner circumferential surface portion 42 of diameter d less than the outer diameter of the first tubular member 12. Cut in the inner surface portion 42 is a circumferential groove 44 formed by one wall 43 oriented perpendicular to an outer surface 45 of the first tubular member 12, and another wall 47 extending between the outer surface of the ring 35 and the one wall 43 and oriented perpendicular thereto. The another wall 47 extends from the one wall 44 toward the opening 17 in the tubular member 13; Formed by the periphery of the one wall 43 is a circumferential knife edge 48 extending parallel to the outer surface 45 of the first tubular member 12. First and second ends 51, 52 of the lock ring 35 straddle a split therein and, as shown in FIG. 3, the second end 52 is axially displaced from the first end 51 which is circumferentially aligned with the major portion of the ring 35.

The auxiliary ring 37 also is formed from a suitable spring material and has separated ends 54, 55 straddling a gap 56. An outer circumference 61 of the auxiliary ring 37 engages the cylindrical surface portion 24 of the cavity portion 32. Cut into an inner circumference 62 are circumferentially spaced apart teeth 63 that form longitudinally disposed edges 64 oriented parallel to the axis of the first tubular member 12. When assembled within the cavity portion 32 of the tubular member 13, the ends 54, 55 of the auxiliary ring 37 and the ends 51, 52 of the lock ring 35 engage opposite sides of the ridge 34 as shown in FIG. 1.

OPERATION

Figure 8:
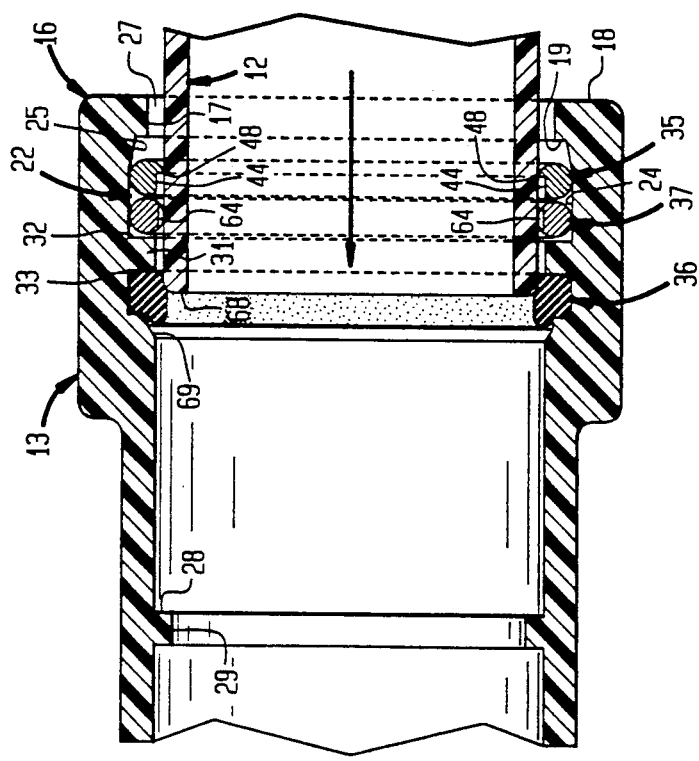
FIG. 8 is a cross sectional view illustrating assembly of the pipe coupling shown in FIGS. 1.

During assembly of the coupling 11, the first tubular member 12 is inserted through the opening 17 in the receiving tubular member 13 until an inner end 68 of the member 12 engages the annular shoulder 28 as shown in FIG. 4. As the first tubular member 12 moves through the annular cavity 22, its external surface engages the knife edge inner surface 48 of the lock ring 35 expanding it outwardly into the cavity portion 32 of the annular cavity 22. However, since the outer diameter D of the lock ring 35 is less than that of the cylindrical wall portion 24, inward axial movement of the first tubular member 12 is not restricted. In addition, the auxiliary ring 37 is compressed between the cylindrical surface portion 24 and the outer surface of the first tubular member 12 which outer surface is scored by the longitudinal projecting edges 64. Because of this penetration of the first tubular member 12 by the edges 64 on the compressed auxiliary ring 37, rotation of the first member 12 within the receiving member 13 is prevented. A tapered annular transitional surface 69 between the cylindrical surface portion 24 and the inner bore 21 accommodates longitudinal migration of the sealing member 36 so as to prevent damage thereto during insertion of the first tubular member 12 as shown in FIG. 8.

After full insertion, the first tubular member 12 is partially withdrawn to produce a longitudinal separation movement relative to the receiving tubular member 13. During that movement, the lock ring 35 is forced longitudinally outwardly in the annular cavity 22 and tightly compressed therein between the shoulder stop 19, the tapered wall portion 25 and the outer surface of the first tubular member 12 as shown in FIG. 9. Because of the penetration of the outer surface of the first tubular member 12 by the knife edge 48 on the lock ring 35, further relative longitudinal movement between the member 12 and the receiving tubular member 13 is prevented. In addition, the second end 52 of the lock ring 35 is forced into circumferential alignment with the first end 51 creating an axially directed force that biases the member 12 inwardly in the member 13. Fluid pressure within the coupling 11 exerts on the first member 12 a longitudinally outwardly directed force F that is transferred by the tapered wall portion 25 radially inwardly on the lock ring 35. Consequently, the knife edge 48 is driven further into the outer surface of the first member 12 and enhancing the securement thereof to the receiving member 13. With the parts in the relative positions shown in FIG. 9, the O-ring 36 is engaged between the cylindrical surface portion 24 and the outer surface of the first tubular member 12 to create a fluid tight seal therebetween. The annular rib 31 prevents damage of the annular sealing member 36 by the teeth 63 on the auxiliary ring 37.

Disassembly of the coupling 11 requires the use of a disengagement tool 71 shown in FIGS. 10-13. The disengagement tool 51 consists of first and second identically shaped arcuate parts 72, 73, respectively. Each of the parts 72, 73 has a longitudinally extending inner cylindrical surface 74 conforming to the outer surface of the first tubular member 12. One end 75 of the part 72 is connected to one end 76 of the part 73 by a flexible connection portion 77 that permits relative pivotal movement therebetween as shown in FIG. 12. When positioned on the outer surface of the first tubular member 12, the parts 72, 73 form a composite tube 78 that defines an outer actuator end 80 having an outwardly facing, annular tapered surface 81. Extending radially outwardly from each of the parts 72, 73 is a flange portion 82, 83, respectively.

To disassemble the coupling 11, the opposite ends 84, 85 of the parts 72, 73, respectively, are separated as shown in FIG. 12 allowing the tool 71 to be positioned around the member 12 with the surfaces 74 engaging the outer surface thereof. Next, the flange portions 82, 83 of the parts 72, 73 are pushed to produce sliding movement of the cylindrical surfaces 74 on the outer surface of the first tubular member 12. That sliding movement is continued to move the annular actuator end 80 of the composite tube 78 through the annular gap 27 until the flange portions 82, 83 engage the outer end 16 of the receiving tubular member 13. During the inward movement of the actuator end 80, the annular tapered surface 81 engages and forces the lock ring 35 into an inward position as shown in FIG. 14. Movement into that inner portion of the cavity 22 allows the lock ring 35 to expand circumferentially in response to the radially outwardly directed force produced by the tapered surface 81. The circumferential expansion eliminates engagement between the lock ring 35 and the outer surface of the first tubular member 12. Accordingly, the first tubular member 12 can be withdrawn easily from the receiving tubular member 13.

Obviously, many modifications and variations of the present invention are possible in light of the above teachings. It is to be understood, therefore, that the invention can be practiced otherwise than as specifically described.

What is claimed is:
1. A coupling assembly comprising:
a first tubular member;
a rigid receiving tubular member defining an opening adapted to receive said first tubular member, said receiving tubular member having an inner portion defining an inner bore dimensioned to receive one end of said first tubular member and an outer portion defining an internal annular cavity intersecting said inner bore and projecting radially outwardly therefrom, said annular cavity comprising an annular tapered wall portion tapered radially inwardly and projecting longitudinally toward said opening;
an annular sealing member disposed in said annular cavity and dimensioned to be engaged between said first tubular member and said receiving tubular member; and
a split lock ring formed from a length of spring material having a substantially circular transverse cross-section and disposed in said annular cavity between said annular sealing member and said opening, said lock ring having an outer circumferential surface portion adapted to engage said tapered wall portion and an inner circumferential surface portion adapted to engage an external wall portion of said first tubular member, said lock ring being adapted to expand circumferentially into said annular cavity during insertion of said first tubular member into said receiving tubular member and to be compressed between said tapered wall portion and said external wall portion in response to relative longitudinal separating movement between said first tubular member and said receiving tubular member, and said inner circumferential surface portion defining circumferentially extending knife edge means for penetrating said external wall portion so as to prevent longitudinal movement of said first tubular member relative to said receiving tubular member; and wherein said receiving tubular member further defines an annular divider means projecting radially into said cavity between said sealing member and said split lock ring, and said tapered wall portion terminates with a radially inwardly directed integrally formed rim defining a shoulder stop portion at an outer end of said receiving tubular member, and said shoulder stop portion is adapted to engage said lock ring in response to said separating movement.

2. An assembly according to claim 1 wherein said knife edge means is a circumferential edge formed by a circumferential groove in said lock ring.

3. An assembly according to claim 2 wherein said groove defines one wall terminated by said circumferential edge and oriented transversely to said external wall portion.

4. An assembly according to claim 3 wherein said one wall is substantially perpendicular to said external wall portion.

5. An assembly according to claim 4 wherein said groove further defines another wall extending between said one wall and an outer surface of said lock ring.

6. An assembly according to claim 5 wherein said another wall is substantially perpendicular to said one wall.

7. An assembly according to claim 1 wherein said lock ring has first and second ends normally axially displaced with said lock ring in a relaxed condition, and said first and second ends are forced toward axial alignment in response to compression of said lock ring between said tapered wall portion and said external wall portion.

8. An assembly according to claim 7 wherein said knife edge means is a circumferential edge formed by a circumferential groove in said lock ring.

9. An assembly according to claim 8 wherein said groove defines one wall terminated by said circumferential edge and oriented transversely to said external wall portion.

10. An assembly according to claim 8 wherein said split ring has an inner diameter less than the outer diameter of said first tubular member.

11. An assembly according to claim 1 wherein said receiving tubular member further defines an annular transitional wall portion tapered between said cavity and said inner bore.

12. An assembly according to claim 1 including an auxiliary ring disposed in said annular cavity between said lock ring and said sealing member, said auxiliary ring being engaged between an inner surface of said cavity and said external wall portion, and wherein an inner circumference of said auxiliary ring defines longitudinal edges projecting substantially parallel to a longitudinal axis of said first tubular member and adapted to penetrate the outer surface thereof.

13. An assembly according to claim 12 wherein said auxiliary ring is a cut ring having separated ends.

14. A coupling assembly comprising:
a first tubular member;
a receiving tubular member defining an opening adapted to receive said first tubular member, said receiving tubular member having an inner portion defining an inner bore dimensioned to receive one end of said first tubular member and an outer portion defining an internal annular cavity intersecting said inner bore and projecting radially outwardly therefrom, said annular cavity comprising an annular tapered wall portion tapered radially inwardly and projecting longitudinally toward said opening;
an annular sealing member disposed in said cavity and dimensioned to be engaged between said first tubular member and said receiving tubular member; and
a split lock ring formed from spring material and disposed in said annular cavity between said annular sealing member and said opening, said lock ring having an outer circumferential surface portion adapted to engage said tapered wall portion and an inner circumferential surface portion adapted to engage an external wall portion of said first tubular member, said lock ring being adapted to expand circumferentially into said annular cavity during insertion of said first tubular member into said receiving tubular member and to be compressed between said tapered wall portion and said external wall portion in response to relative longitudinal separating movement between said first tubular member and said receiving tubular member, and said inner circumferential surface portion defining circumferentially extending knife edge means for penetrating said external wall portion so as to prevent longitudinal movement of said first tubular member relative to said receiving tubular member; and wherein said lock ring has first and second ends normally axially displaced with said lock ring in a relaxed condition, and said first and second ends are forced toward axial alignment in response to compression of said lock ring between said tapered wall portion and said external wall portion.

15. An assembly according to claim 14 wherein said knife edge means is a circumferential edge formed by a circumferential groove in said lock ring.

16. An assembly according to claim 15 wherein said groove defines one wall terminated by said circumferential edge and oriented transversely to said external wall portion.

17. An assembly according to claim 16 wherein said split ring has an inner diameter less than the outer diameter of said first tubular member.

18. An assembly according to claim 14 wherein said lock ring has a substantially circular cross-section.

19. An assembly according to claim 18 wherein said annular cavity includes a longitudinal ridge, and said first and second ends and said separated ends are disposed on opposite sides of said ridge.

20. An assembly according to claim 19 wherein said receiving member defines an annular rib projecting radially into said annular cavity and disposed between said auxiliary ring and said sealing member.

21. An assembly according to claim 13 wherein said annular cavity further comprises a cylindrical wall portion extending between said tapered wall portion and said inner bore, and said auxiliary ring and said sealing member are adapted for engagement between said cylindrical wall portion and said first tubular member.

22. An assembly according to claim 21 wherein said lock ring is dimensioned so as to prevent engagement thereof with said cylindrical wall portion during said circumferential expansion by said first tubular member.

23. An assembly according to claim 1 wherein said tapered wall portion terminates with a radially inwardly directed rim forming a shoulder stop portion at an outer end of said receiving tubular member, and said stop portion is adapted to engage said lock ring in response to said separating movement.

* * * * *